March 24, 1925.  J. M. HOWARD  1,531,100
PLANTING TOOL
Filed May 15, 1924
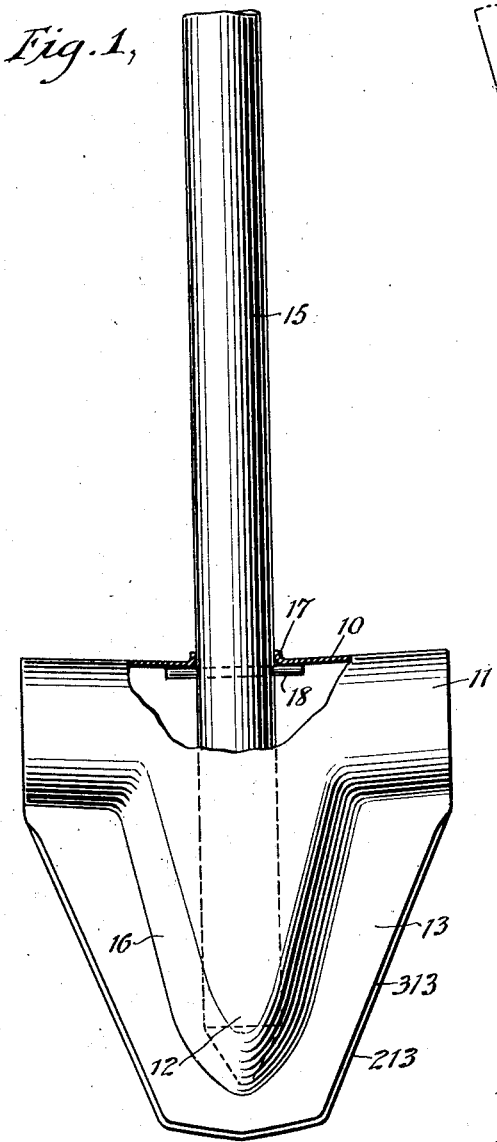
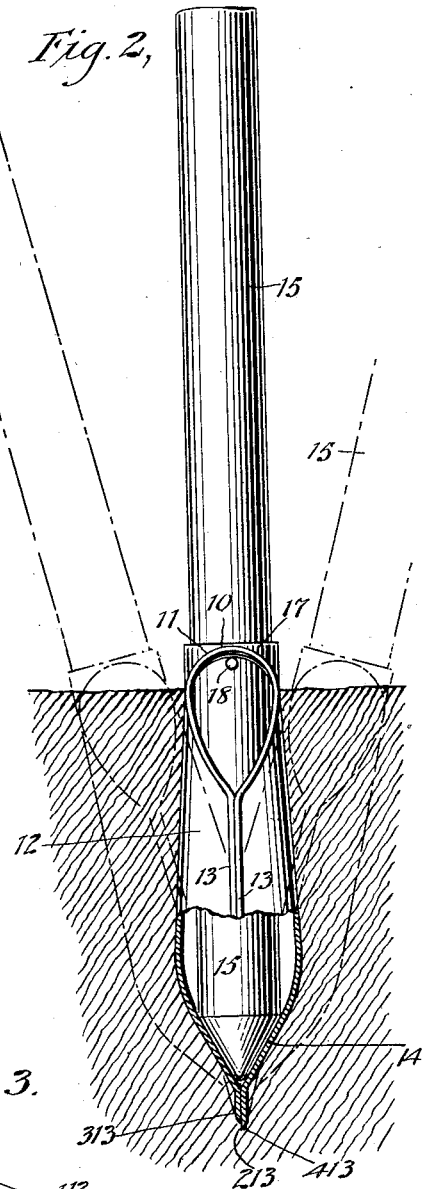
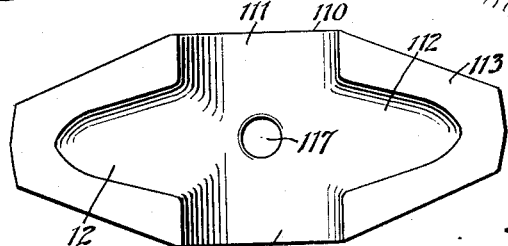
WITNESSES
INVENTOR
John M. Howard
BY
ATTORNEYS Patented Mar. 24, 1925.

UNITED STATES PATENT OFFICE.

JOHN MARTIN HOWARD, OF MEDIA, PENNSYLVANIA.

PLANTING TOOL.

Application filed May 15, 1924. Serial No. 713,594.

*To all whom it may concern:*

Be it known that I, JOHN M. HOWARD, a citizen of the United States of America, and a resident of Media, in the county of Delaware and State of Pennsylvania, have invented a new and Improved Planting Tool, of which the following is a description.

My invention relates to a tool for opening furrows for giving molded formation to tilled soil for receiving seeds, bulbs, or the like, to be planted, as well as adapting the formation of the ground to receive fertilizers, water, and other plant nutriment.

The general object of my invention is to provide a planting tool adapted to furrow or mold the soil without disturbing the same after having been turned over by the plow and harrowed and similarly treated so that clods of grass, refuse, humis, etc. which have been turned under will not be brought to the surface to produce sproutings thereof but will be left in the turned-over form to provide humis and nourishment for the crops.

A more specific object of the invention is to provide a construction in which the blade embodies novel means to firmly receive the handle and having a formation adapting the implement to molding of the soil to receive bulbs, roots, etc.

Reference is to be had to the accompanying drawings forming a part of this specification, it being understood that the drawings are merely illustrative of one example of the invention.

Figure 1 is a side elevation of an implement embodying my invention, parts being broken away, and in section;

Figure 2 is an edge view of the tool inserted in the ground and indicating by dotted lines the vibration of the tool in molding the ground;

Figure 3 is a plan view of the blank for forming the blade and handle socket.

In forming a tool in accordance with the illustrated example I produce a blade designated generally by the numeral 10 from a blank of sheet metal shown in Figure 3 and designated 110. Said blank has a transverse concave depression 111 formed therein and at opposite sides of the transverse depression 111 I produce tapering depressions 112. The ends of the blank outside of the depressions 112 have plane V-shaped portions 113. The blank is bent on itself so that the transverse depressed central portion 111 produces a hollow head 11 forming the back of the blade; and also an enlarged or thickened hollow portion 12 tapering forwardly from said head, the plane portions 113 of the blank forming a flange 13 of double thickness, the respective plane portions of the blank lying in close relation in the formed blade.

The hollow thickened portion 12 constitutes at the interior of the blade and at the flanged edge of said thickened portion a socket (14) for receiving the forward end of the tool handle 15. The sides of the tapered thickened hollow portion 12 at opposite sides of the blades are bevelled as at 16, the bevelling as at 16 contributing to the formation of the socket 14. The handle 15 extends through a hole in the tubular head 11 at the center. The hole for the handle is formed by producing a hole 117 at the medial line of the transverse depressed portion 11 in the blank and at said hole is formed an annular flange or short ferrule 17 to brace the handle in position in the blade.

The fastening of the handle to the blade is completed by a transverse pin 18 which is passed through the handle at the hole 17 and overlaps the material of the head 11 at the interior at opposite sides of the hole in the head. Said pin 18 is accessible through the open ends of the head 11.

The blank 110 at one end is longer than the other end having reference to a line drawn transversely and passing through the center of the hole 117 so that when the blank is bent or returned on itself on the medial line of the transverse depression 111, one plane portion 113 will extend beyond the other plane portion 113, thereby giving the flange 13 in the formed blade an edge portion 213 extending at the sides and front end of said flange as shown in Figures 1 and 2. The projecting edge portion 213 forms with the edge portion 313 inward therefrom the equivalent of a bevelled edge at one side of the flange 13; the projecting edge 213 at the side of the blade opposite that presenting the edge 313 may be abruptly bevelled as at 413. The result is that the blade possesses an efficient cutting edge and the efficiency in the cutting edge is preserved even though the projecting edge portion 213 and the edge portion 313 inward therefrom become dulled.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A planting tool including a blade, consisting of a plate bent to turn on itself, said blade presenting at the top thereof a tubular transverse head, and a hollow thickened portion extending forwardly from said head and tapering, said forwardly extending thickened portion constituting interiorly a socket at the front end thereof to receive the front end of a handle, said blade at the sides and front of said thickened hollow portion being in the form of a flange of double thickness, the one thickness extending beyond the other, said hollow head at the center thereof having a hole alining with said socket through which a handle may extend.

2. A planting tool comprising a blade having a hollow head at the top and having a hollow portion extending forwardly from said head, said hollow portion presenting at the front end thereof at the interior a handle socket, there being a hole in said head alining with said socket for the passage of a handle.

3. A planting tool comprising a blade having a hollow head at the top and having a hollow portion extending forwardly from said head, said hollow portion presenting at its front end thereof a handle socket, said head having a hole therein alining with said socket for the passage of a handle; together with a cutting flange at the sides and front of said thickened portion.

4. A blade for planting tools having an interior handle socket near the front end thereof and having at the back of the blade a hole alining with said socket and through which the handle may extend to the socket.

5. A blade for planting tools having an interior handle socket near the front end thereof and having at the back of the blade a hole alining with said socket and through which the handle may extend to the socket; together with a cutting flange on the blade at the front and continued over a distance along the sides.

6. A planting tool comprising a blade, and a handle, the blade presenting an interior handle socket near the front end thereof, said socket receiving the front end of the handle and said blade having a hole at the back alined with said socket, the edge portion of the blade being in the form of a hollow head having open ends; together with a transverse pin disposed in said head and extending through said handle, the ends of the pin being accessible through the open ends of the head.

JOHN MARTIN HOWARD.